US008381972B2

(12) United States Patent
Beemer et al.

(10) Patent No.: US 8,381,972 B2
(45) Date of Patent: Feb. 26, 2013

(54) CUSTOMIZED TRANSACTION CARD AND ACCOUNT REPORTS

(75) Inventors: Layne Beemer, Blair, NE (US); William Hickox, Omaha, NE (US); Ronald L. Prchal, Plattsmouth, NE (US)

(73) Assignee: First Data Corporation, Englewood, CO (US)

( * ) Notice: Subject to any disclaimer, the term of this patent is extended or adjusted under 35 U.S.C. 154(b) by 2006 days.

(21) Appl. No.: 11/269,939

(22) Filed: Nov. 8, 2005

(65) Prior Publication Data

US 2007/0102510 A1 May 10, 2007

(51) Int. Cl.
*G06K 5/00* (2006.01)

(52) U.S. Cl. ........................................ 235/380; 235/382

(58) Field of Classification Search .................. 235/380, 235/375, 382, 382.5; 705/35, 39, 72, 50, 705/64, 26
See application file for complete search history.

(56) References Cited

U.S. PATENT DOCUMENTS 5,513,117 A 4/1996 Small
6,829,519 B2 12/2004 Liberty et al.
6,912,312 B1 * 6/2005 Milner et al. ................. 382/218
7,117,173 B1 * 10/2006 Ambani .......................... 705/35
7,258,272 B2 * 8/2007 Yoshizane et al. ............ 235/380
2002/0103711 A1 8/2002 Karas et al.
2003/0018587 A1 * 1/2003 Althoff et al. ................... 705/64
2003/0023557 A1 * 1/2003 Moore ............................ 705/50
2004/0155960 A1 * 8/2004 Wren et al. ................... 348/150
2004/0205138 A1 10/2004 Friedman et al.
2005/0165667 A1 * 7/2005 Cox ................................ 705/35
2007/0102510 A1 * 5/2007 Beemer et al. ................ 235/380
2007/0215239 A1 * 9/2007 Dorney ........................... 141/94

* cited by examiner

*Primary Examiner* — Thien M Le
(74) *Attorney, Agent, or Firm* — Kilpatrick Townsend & Stockton, LLP

(57) ABSTRACT

A method of customizing communications to a transaction account user is described. The method may include the steps of incorporating a customized image sent by the user on a transaction card that is provided to the user, and displaying the customized image on one or more account message seen by the user. Also, a method to customize messages about a transaction account to an account user is described. The method may include the steps of sending the account user a customized transaction card having a customized image received from a person opening the account, and incorporating the customized image on one or more messages about the account that are sent to the account user.

12 Claims, 7 Drawing Sheets

CUSTOMIZED TRANSACTION CARD AND ACCOUNT REPORTS

CROSS-REFERENCES TO RELATED APPLICATIONS

This application is related to U.S. patent application Ser. No. 10/988,006 filed Nov. 12, 2004, and titled "PERSONALIZED PRESENTATION INSTRUMENT PRODUCTION SYSTEMS AND METHODS", and also related to U.S. patent application Ser. No. 10/461,203 filed Jun. 12, 2003, and titled "PRESENTATION INSTRUMENT PRODUCTION SYSTEMS AND METHODS". The entire contents of both applications are hereby incorporated by reference for all purposes.

FIELD OF THE INVENTION

The invention relates to the customization of a transaction account through the personalization of transaction cards and information sent to an account user. More specifically, the invention relates to the incorporation of customized images on the transaction card and information sent to the account user.

BACKGROUND OF THE INVENTION

Transaction card marketers have come to recognize the appeal of affinity marketing in subscribing and retaining transaction account customers. In affinity marketing, the transaction card issuers offer a choice of images and symbols that a card holder can have displayed on the transaction card to show his or her affinity for a person, group, organization, institution, etc., associated with the images. Examples of these types of affinity transaction cards include cards that display images and symbols associated with sports teams, professional organizations, civic organizations, governmental organizations, businesses, colleges and universities, and geographical locations (e.g., cities, states, provinces, countries, etc.), among others.

While affinity transaction cards have a demonstrated popularity with transaction account customers, the degree of customization and personalization is still limited. Individual transaction card issuers generally offer a limited collection of images and symbols that can be displayed on the transaction card. In addition, from an account customer's perspective, a card design having images and symbols of interest is generally only available from a limited number of transaction card issuers (often just one). Thus, increasing the choices of images and symbols offered by a wider variety of transaction card issuers will enhance ability of the issuers to attract and retain customers through affinity marketing.

Transaction card issuers also appreciate that personalization of transaction cards can attract customers and instill customer loyalty. Credit card issuers, for example, often print the year that the cardholder first subscribed to the account on the face of the card. Unfortunately, card personalization has been generally limited to alpha-numeric text (e.g., cardholder name, membership year, etc.) and thumbnail pictures of the cardholder that are used for security purposes. Incorporating more decorative and stylized symbols and images on a transaction card to personalize the card for an individual, family, private organization, or private business is generally not offered by card issuers. Thus, there is also a need for enhancing the ability to personalize transaction cards for an individual or group. These and other issues are addressed by the present invention.

BRIEF SUMMARY OF THE INVENTION

Embodiments of the invention include methods of customizing communications to a transaction account user. The methods may include the steps of incorporating a customized image sent by the user on a transaction card that is provided to the user, and displaying the customized image on one or more account message seen by the user.

Embodiments of the invention also include methods to customize messages about a transaction account to an account user. The methods may include the steps of sending the account user a customized transaction card having a customized image received from a person opening the account, and incorporating the customized image on one or more messages about the account that are sent to the account user.

Embodiments of the invention still further include methods of customizing a statement for a transaction account used by two or more account users. The methods may include sending a first account user a first customized transaction card having a first customized image, and a second account user a second customized transaction card having a second customized image, wherein the first and the second customized images are different. The methods may also include displaying the first customized image next to one or more transactions listed on the customized statement that were conducted with the first customized transaction card, and displaying the second customized image next to one or more transactions listed on the customized statement that were conducted with the second customized transaction card.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

DETAILED DESCRIPTION OF THE INVENTION

The present invention relates to methods and systems for enhancing the customization and personalization of transaction card accounts. This may include the incorporation of a customized image provided by a card user onto a transaction card, as well as displaying the customized image on information sent to the card user, such as an electronic and/or printed account statement, an electronic and/or printed promotional offer, an electronic and/or printed terms and conditions for the transaction account, among other information. The customized image may be personalized for a single account used by a single account user, or customized for multiple accounts used by multiple account users (e.g., employees of a business, members of a club or organization, etc.).

The customized image may also be customized for a single account used by multiple account users. For example, a transaction card account such as a debit or credit card account may be shared by multiple members of a family, with each family member being issued a copy of the transaction card having the customized image that also appears on periodic transaction statements associated with the transaction account. A second customized image may also appear on the transaction card that is unique for each member of the family (e.g., the stylized name, initials, and/or nickname of the family member, a graphical icon or cartoon character that represents the family member, etc.). The second image may also appear next to information about the transactions conducted by each family member on messages and/or statements sent by the transaction account manager. Similar systems and methods may be used to customize a transaction account shared by two or more employees of a business, and two or more members of an organization, among other groups.

Figure 1A:
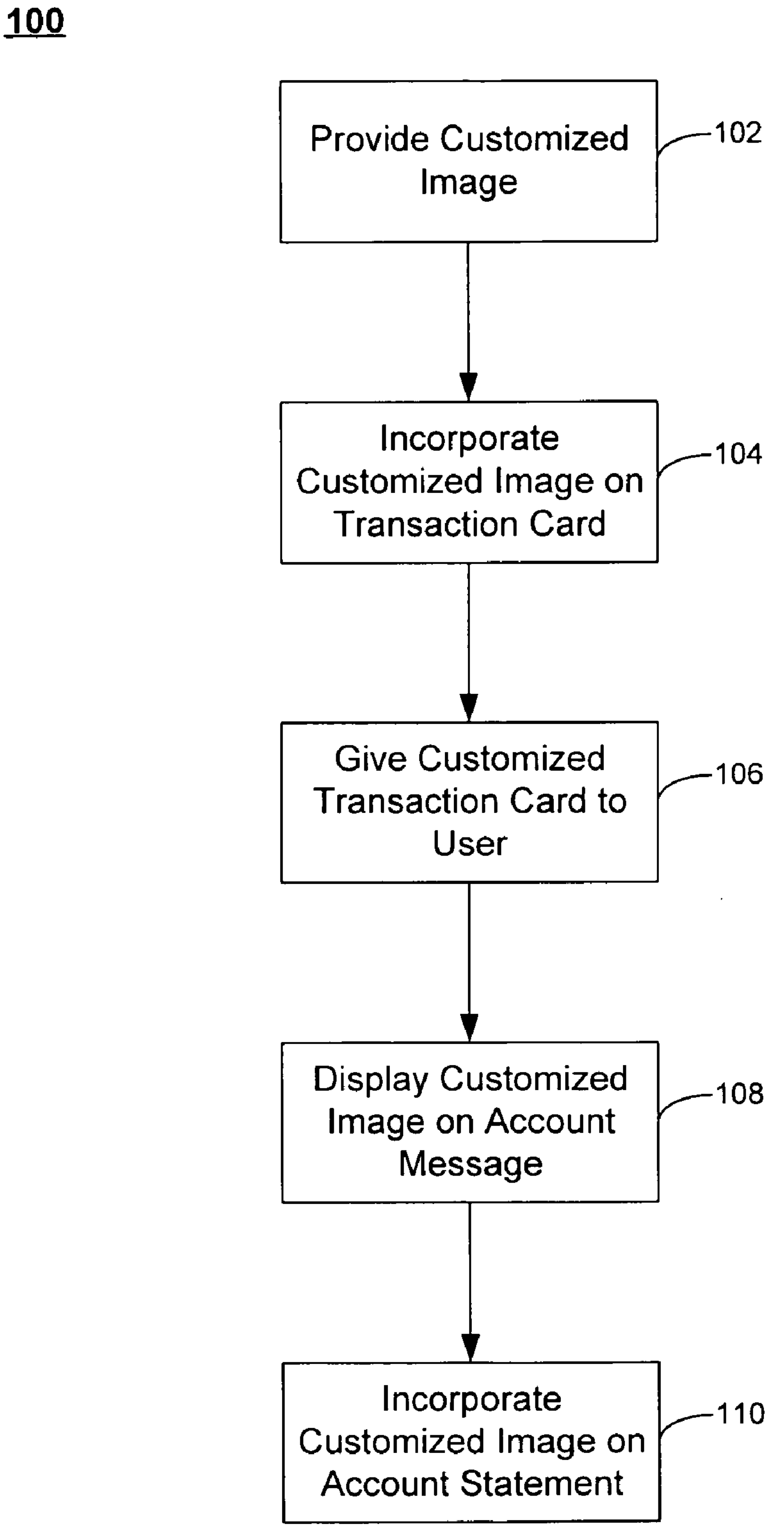
FIG. 1A is a flowchart illustrating steps in a method of customizing communications to a transaction account according to embodiments of the invention.

Referring now to FIG. 1A, a flowchart is shown that illustrates a method 100 of customizing communications to a transaction account according to embodiments of the invention. The method 100 includes the account user providing a customized image 102 to the card provider (or an order fulfillment agent of the provider). The customized image may be a drawing or picture that is mailed to the card provider, or more likely an electronic image sent to the card provider through an electronic network, such as the Internet. Embodiments for methods of selecting and incorporating a customized image in a card design layout are described with reference to FIG. 1B below.

In some instances, the customized image is provided when the account user signs up for the account. For example, the user may attach the customized image as part of a printed or electronic application to open the transaction account. In additional instances, the account user may provide the customized image while renewing a subscription to the transaction account. In further additional instances, the account user may provide the customized image at any time while the account is active.

The card provider receiving the customized image may incorporate it into a transaction card 104, which is then given to the card user 106. For electronic customized images that are received from an electronic network (e.g., the Internet), the images may be stored in a database an identified by an account number, account user's name, etc. For non-electronic images (e.g., printed images), the card provider may digitize the image into an electronic form and store it in the same or different database than electronic images received over the electronic network. The electronic customized images may be formatted as a standardized electronic image file such as, for example, a jpeg file, a gif file, a tiff file, a bitmap file, a jpeg 2000 file, and/or a png file, among other file formats.

The electronic customized image stored in an image database and identified by one or more designated transaction accounts may be used to personalize messages sent to an account user. For example, the customized image may be displayed on an account message 108 sent to the account user. The account message may be an electronic message sent to an email account held by the account user. The customized image may be displayed somewhere in the body of the email message and/or the subject line, sender address line, recipient address line, etc. Electronic account messages may also include messages displayed on a website that the user can view with an appropriate web browser. The customized image can be displayed somewhere in the website message to personalize the message for the account user.

The customized image may also be incorporated into an account statement or other document and/or message sent to the account user 110. For a paper account statement mailed to the user, the customized image may be printed on one or more pages of the statement. The customized image may also be printed on the envelope used to mail the statement, allowing easy identification of the statement from other pieces of mail the account user receives. For electronic account statements viewed by a user on a computer, television, personal digital assistant (PDA), wireless telephone, portable digital media device etc., that customized image may be displayed somewhere in the statement (e.g., at the top of the statement). The customized image may be displayed on every account statement sent to the account user until the account is terminated, or until the account user sends instructions to discontinue and/or replace the customized image.

Figure 1B:
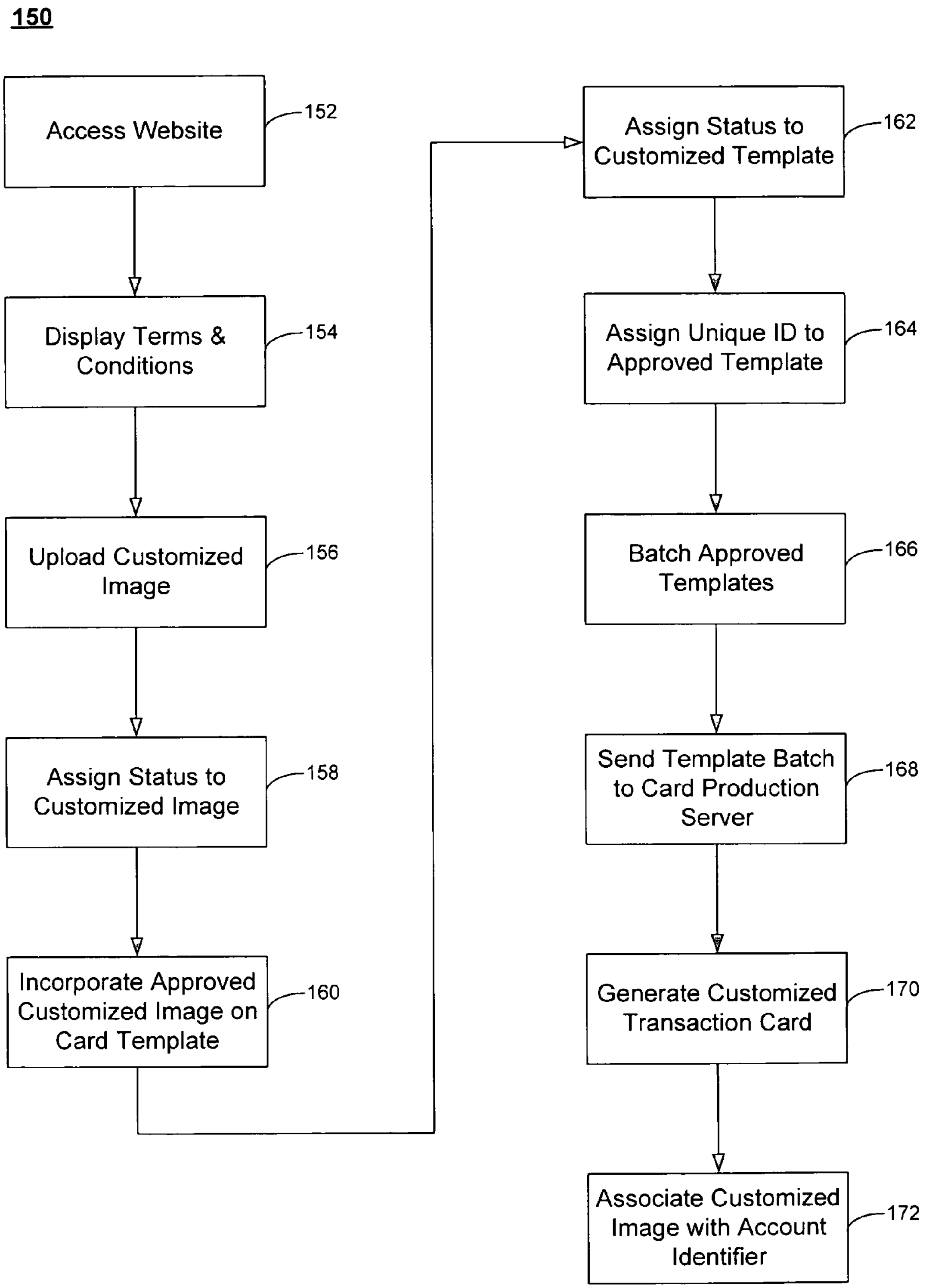
FIG. 1B is a flowchart that shows steps in a method of incorporating a customized image in a card design layout according to embodiments of the invention.

Referring now to FIG. 1B, a flowchart showing steps in a method 150 of incorporating a customized image in a card design layout according to embodiments of the invention is shown. The method 150 may include a transaction card applicant or transaction account user accessing a website 152 with a web browser operating on a computer, PDA, mobile phone, etc. The website may be hosted by an Internet connected web server in communication with the transaction card account provider. The website may include a hyperlink for customizing a transaction card and messages associated with the card account, with the hyperlink directing the applicant or user to one or more web pages for performing the customization process. The web pages may include the display of terms and conditions 154 associated with incorporating a customized image on a transaction card and messages. The terms and conditions may include the right of the account provider to reject any image the provider believes lacks a proper level of decorum, any image whose incorporation into the card and messages may violate copyright and/or trademark laws, any image that may violate a person or organization's rights of privacy and/or publicity, etc. Individual terms and conditions may be associated with a "term code" or "condition code" that may be provided to a user whose uploaded image has be rejected by the account provider.

After the applicant or user agrees to the terms and conditions (e.g., clicking on an "I Agree" button on the web page) a customized image may be uploaded 156 by the user to the web server. The server may then display one or more versions of the customized image (e.g., a full-sized image, a thumbnail image, a high-resolution image, a low-resolution image, etc.) on a web page that allows the user to assign a status to the image 158. Image statuses that may be assigned may include "Approved", where the customized image can be incorporated as-is on transaction cards and messages. Statuses may also include "Pending", where the image is saved for further consideration and/or modification, and "Rejected" where the image is flagged for deletion from the server, and will not be processed further by the account provider. The uploaded image may also receive an approved or rejected status from the account provider based on whether the image conforms with the provider's terms and conditions.

For example, an uploaded image designated as "pending" by either the user or account provider may be stored on a server (or a storage medium in electronic communication with the server) for a predefined period of time (e.g., 5-14 days, 1 month, 6 months, etc.). Embodiments of the invention include sending the user a reminder that a pending image will be deleted from the server in a specified period of time. Reminders may also be sent informing the user of a change in status from "pending" to "approved" or "rejected" when the account provider originally assigns a pending status to the image.

Approved customized images may be incorporated on a card template 160 displayed on a web page. The card template may include an area having the relative shape and proportions of the transaction card (although not necessarily to scale), in which the user can place the customized image. The user may also have options for choosing the background imagery for the card, typeface styles and colors, etc. Embodiments may include a starting with a default card template that places the customized image in a default scale and position on a card. The user may assign a status to the card template 162, which may include "approved", "pending", or "rejected". A "pending" template may be saved on the server for later manipulation by the user, and an "approved" template may be incorporated into the customized transaction card.

When a transaction card template is "approved" it may be assigned a unique identification number 164, which may be used to identify and retrieve the template and/or customized image from a database accessible by the card provider. The template data, may also be batched with other approved templates 166, and the batch may be sent to a production card server 168. The server may be in electronic communication with a digital card printing unit that incorporate each template in the batch onto blank card stock to generate the customized transaction card 170.

A transaction account number associated with and incorporated on the transaction card (e.g., encoded in a chip or magnetic strip on the card, and/or printed on the card) may also be associated with the unique identification of the customized template and/or customized image 172. This can permit the customized image to be identified and incorporated on messages (e.g., printed messages, electronic messages, etc.) that are associated with the transaction account number.

Figure 2:
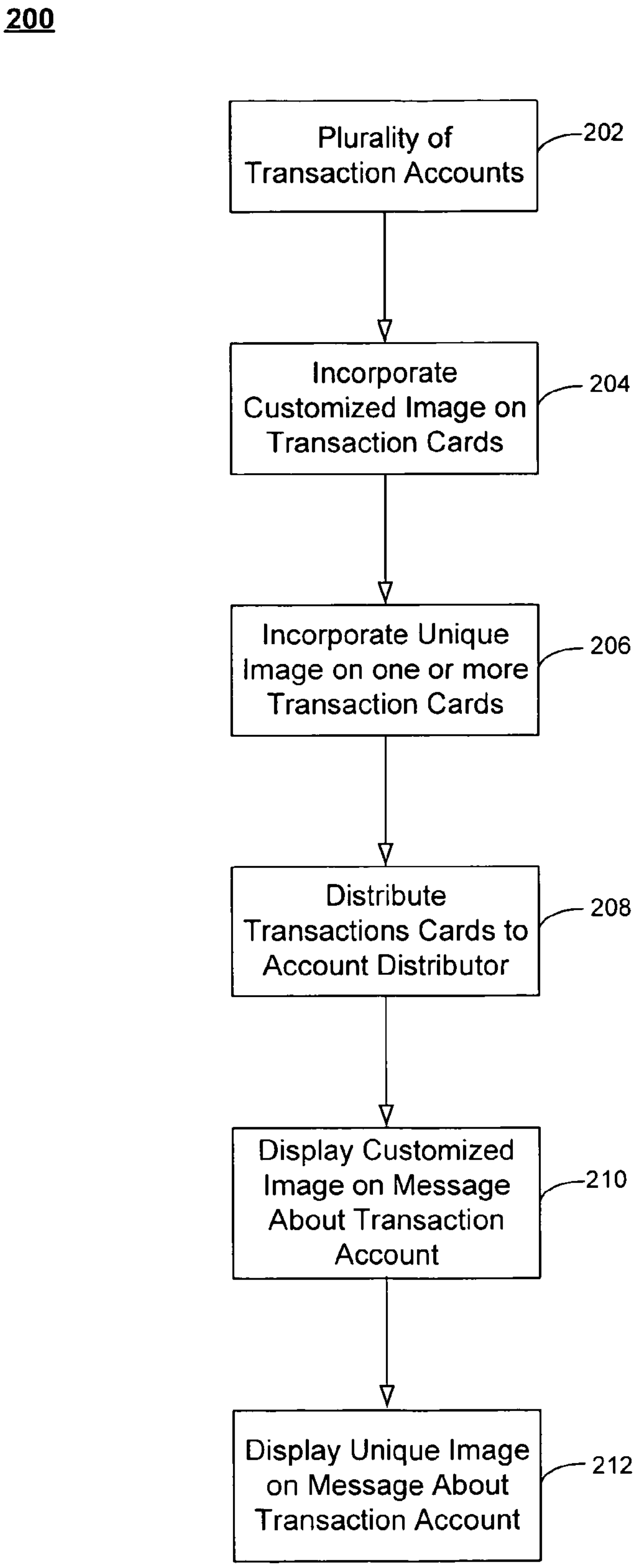
FIG. 2 is a flowchart showing steps in a method of customizing communications for a plurality of affiliated transaction accounts according to embodiments of the invention.

FIG. 2 is a flowchart showing steps in a method 200 of customizing communications for a plurality of affiliated transaction accounts according to embodiments of the invention is shown. The method 200 may include the step of associating a plurality of transaction accounts 202 so that a customized image can be incorporated on the transaction cards 204 associated with each of the transaction accounts. The plurality of transaction accounts may be used by a group entity that has more than one member, such as a family, a public or private organization, a business, an institution, etc, and the customized image may be designed to affiliate the entity with the transaction card. In additional to the customized image, individual members of the group may also send a unique image that may be incorporated on a transaction card that the member will use 206. Thus, the transaction card may be personalized both at the entity level, and the level of an individual entity member who uses the card.

The personalized transaction cards may be sent by the provider to an account distributor at the group entity who distributes the cards 208 to a group of entity members. The distributor may distribute the transaction cards to all members of the entity, or a subset of less than all the members of the group. In additional embodiments (not shown), the account distributor may be replaced by direct distribution (e.g., mailing) of the personalized cards from the card provider to the members of the group.

For example, a business may request a group of transaction accounts from a transaction account provider, and send the provider a customized image with a company trademark, logo, image, etc., that will be incorporated on the transaction cards associated with the group of accounts. The account provider will create (or reserve) the group of transaction accounts for the business, and associate the accounts with the business by, for example, identifying the name and address of the business with each account. The provider will also incorporate the customized image on the transaction cards that can be used by account users to conduct transactions in the accounts, and distribute the cards to an account distributor or the individual members.

In addition to displaying the customized image on the transaction cards, the transaction account provider (which may include a transaction account administrator authorized by the account provider to administer the transaction accounts) may also display the customized image on messages about the transaction accounts 210. The messages, which may include periodic statements of the transaction activity in an account, may also display the unique image 212 that personalizes the message to individual group members.

Figure 3:
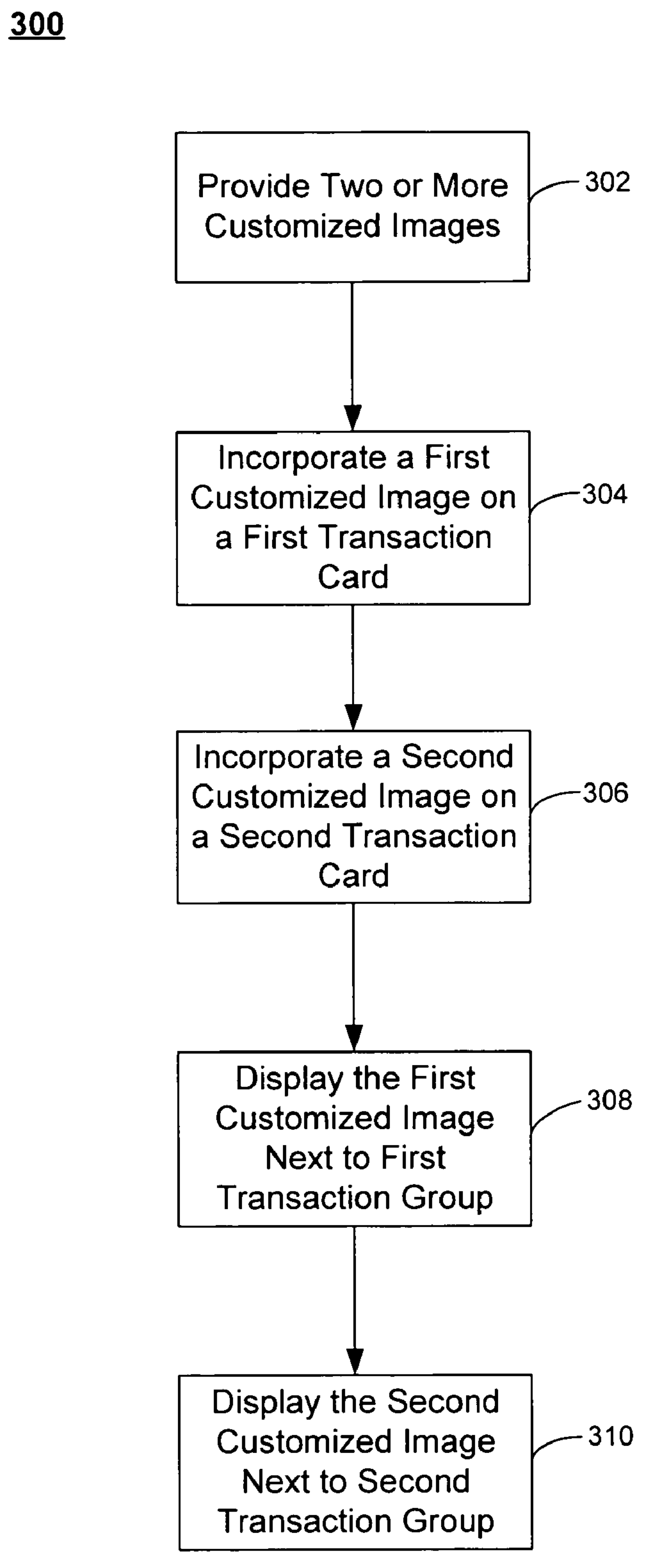
FIG. 3 is a flowchart that shows steps in a method of customizing a statement for a transaction account that is shared between two or more account users.

FIG. 3 shows steps in a method 300 of customizing a statement for a transaction account that is shared between two or more account users. The two or more account users may be, for example, members of a family who share the transaction account and each have a transaction card used to conduct transactions in the account. The method 300 may include providing two or more customized images 302 to the transaction account provider. The customized images may include pictures, symbols, signatures, initials, etc., that uniquely identify the card user from other users of the account. The transaction account provider may incorporate one of the received customized images on a first transaction card 304, and a second received customized image on a second transaction card 306.

When a message or statement is sent to a postal or electronic address associated with the transaction account, each customized image may be displayed with information for the account user associated with the image. For example, a periodic account statement mailed to billing address associated with the transaction account may show the first customized image next to the transaction activity associated with the first account user 308, and show the second customized image next to transaction activity associated with the second user of the shared account 310. Unique customized images associated with additional account users may also be shown on the statement, as well as the transaction card held by the additional user. The customized images may also be displayed on an electronic statement or other electronic message viewable by the account users on a personal computer or other electronic display device (e.g., a personal digital assistant (PDA), wireless telephone, a portable digital media device, etc.). The customized images may also be displayed on email messages sent to the account users. A customized image may, for example, be displayed somewhere in the body of the email message, and/or in the recipient address line, sender address line, subject line, etc. of the email message.

Figure 4:
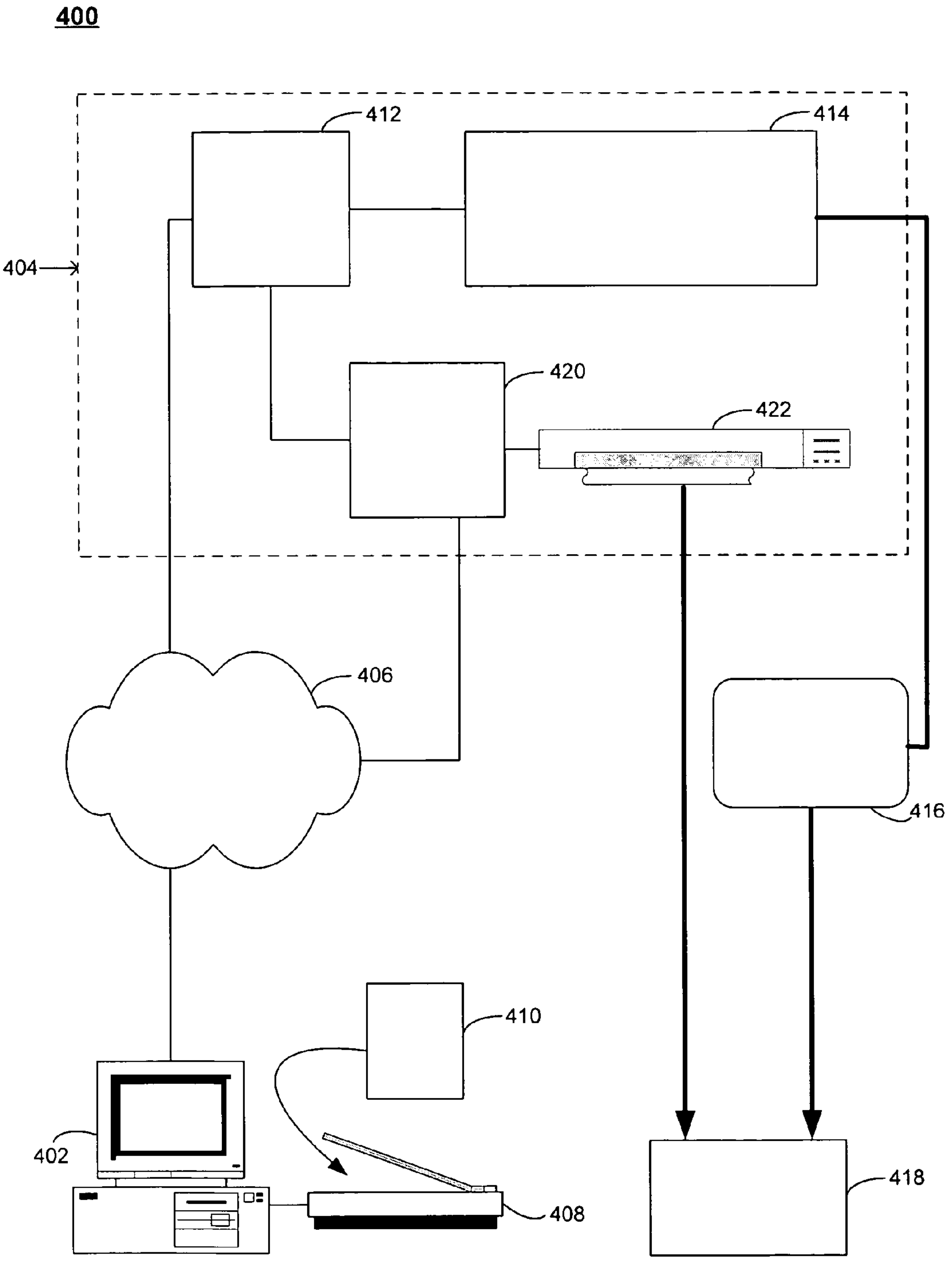
FIG. 4 shows a system for customizing transaction cards and sending customized messages about the transaction account according to embodiments of the invention.

Referring now to FIG. 4, a system 400 for customizing transaction cards and sending customized messages about the transaction account according to embodiments of the invention is shown. The system 400 may include a computer 402 located at the home, workplace, etc., of an applicant or user of a transaction account, who may use the computer 402 to send a customized image to the system of the transaction provider 404 via an electronic network 406. The electronic network may be any communication network capable of providing communications between computer 402 and system of the transaction provider 404. For example, the electronic network 406 may be the Internet providing packet based communication. In other examples, network 406 may include a TCP/IP compliant virtual private network (VPN). Other communications networks may also be used, such as a local area network (LAN), a wide-area network (WAN), a telephone network, a cellular telephone network, an optical network, a wireless data network (e.g., a Wi-Fi network), as well as combinations of these networks.

In the embodiment illustrated in FIG. 4, the applicant or user may use a scanner 408 (or other image digitization device) to make an electronic image of a picture 410 displaying the customized image, and send the electronic image to the transaction provider system 404. Alternatively, the applicant or user may create the customized image electronically and send it to the provider system 404. The applicant may also use other electronic devices (not shown) to create, digitize, transmit, etc. the customized image. For example, the user may transit the image using a PDA, wireless telephone, and/or portable digital media device, among other electronic devices. The electronic device may be located in the applicant's home, or as part of an electronic kiosk located in a store, office building, etc.

The customized image may be received at the image processing unit 412 of the provider system 404. The image processing unit 412 may include one or more microprocessor based devices capable of executing software instructions to associate the customized image with a transaction account, and storing the image in a database (not shown) for later retrieval when needed. The processing unit 412, may also send electronic data that includes the image via an electronic communications network (e.g., LAN, WAN, Internet, etc.) to a transaction card printing unit 414. The printing unit 414 may be a digital card printing unit that can receive electronic images, including customized images sent by a card applicant/user, and print them on blank card stock. The blank card stock may be white plastic card stock having standard credit card dimensions, and which may or may not come pre-embossed with holographic image(s) and/or one or more logos of a transaction card payment processor (e.g., Visa, Mastercard, etc.), among other indicia. The printing unit 414 may be configured to incorporate the digitized image into an electronic template that may also include other images, logos, account numbers, security indicia, background designs, etc., which is printed on a surface of a blank card fed through the printing unit 414. The unit 414 may also include a component for forming raised alpha-numeric characters and other indicia on the card. The customized image may be printed in full color, edge-to-edge on the transaction card 416, or printed on a smaller portion of the card 416. The image may be printed on a front side of the card, a back side of the card, or both sides of the transaction card 416. The card printing unit 414 may incorporate the image on the card 416 using offset printing and/or digital card printing, among other card printing processes.

The finished transaction card 416 created by printing unit 414 may be prepared for delivery to the card applicant/user. In some embodiments, the card 416 may be bundled with inserts and other offer items that will be mailed to the user. These inserts and offer items may be pre-selected by the user, and/or may be bundled based on decision information about the user (e.g., sex, age, address, education level, purchase history, credit history, known group affiliations, etc.). Additional description of components used to package and mail the transaction card 416 to a mailbox 418 accessible to the transaction card user may be found in co-assigned U.S. Pat. No. 6,829,519, issued Dec. 7, 2004, and titled "SYSTEMS FOR ASSEMBLING MAILINGS AND METHODS FOR EXTERNAL CONTROL THEREOF", the entire contents of which is herein incorporated by reference for all purposes. The system 400 may also include hardware and software to execute decision logic for determining the types of messages (e.g., printed messages, electronic messages, etc.) to send to the card user. Additional description of the system components and methods used to implement this decision logic may be found in co-assigned U.S. patent application Ser. No. 11/152,040, filed Jun. 13, 2005, and titled "STRATEGIC COMMUNICATIONS SYSTEMS AND METHODS," the entire contents of which are herein incorporated by reference for all purposes.

The processing unit 412 may also receive a request to send data with the customized image from a message processing unit 420 in electronic communication with the processing unit 412. The message processing unit 420 may include one or more microprocessors that can run software to incorporate the image into a message for the account user. The message processing unit 420 may also be in communication with the electronic network 406 to send electronic messages displaying the customized image to the account user who can view the message at computer 402 (or some other node in communication with the network 406). In additional examples (not shown) the message may be sent to an electronic device in addition to (or in lieu of) the computer 402, such as a PDA, wireless telephone, a portable digital media device, etc. The message processing unit 420 may also be in electronic communication with printer 422, which can print a message incorporating the image. The message processing unit 420 may also be in communication with a system to print the image on an insert or offer item (not shown) that gets inserted with the printed message mailed to the transaction account user at mailbox 418. The system 400 may also process two or more images for incorporation on the transaction card 416, and the electronic and printed messages about the transaction account.

The printed message may be a periodic statement of activity in the transaction account, may be mailed to the transaction account user at mailbox 418. These statements may include a summary of the transactions the user has made with the transaction card since the previous periodic statement was generated and mailed. The message processing unit 420 may include software for incorporating one or more digital files of the customized mage into an electronic file for the periodic statement. The software may include formatting instructions for the sizing and placement of the image in the periodic statement document, which may then be printed by, for example, printer 422.

It should be appreciated that system 400 is but one of many possible configurations for customizing transaction cards and sending customized transaction messages according to embodiments of the invention. As noted above, the picture of the customized image 410 may be sent directly to the account provider or processor for digitization and processing. The customized image may include an electronic image captured with a digital camera (not shown) that is in electronic communication with the computer 402. At the account provider, the functions of generating a transaction card with the customized image, and generating messages incorporating the customized image may be outsourced to off-site fulfillment organizations. These embodiments may include transferring the electronic image to the offsite facility via a public or private electronic network along with information about the transaction account that is also incorporated onto the transaction card or message. Numerous other variations on system 400 encompassed by the invention are possible.

Figure 5A:
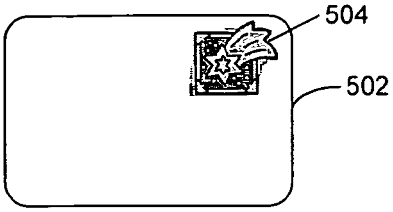
FIG. 5A shows an example of a customized transaction card according to embodiments of the invention.
Figure 5B:
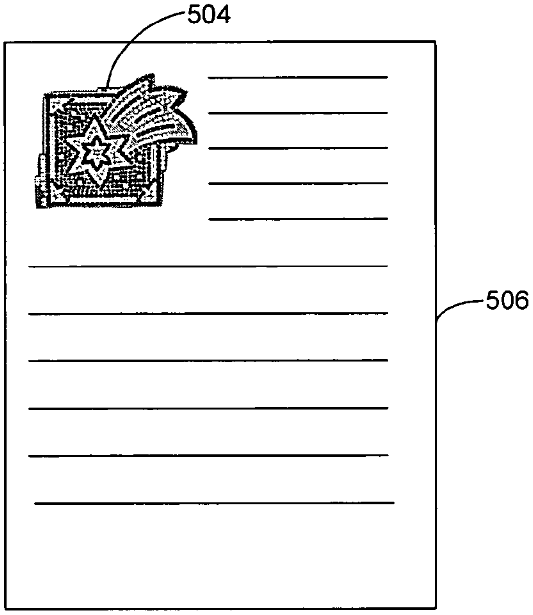
FIG. 5B shows an example of a customized printed transaction account statement according to embodiments of the invention.
Figure 5C:
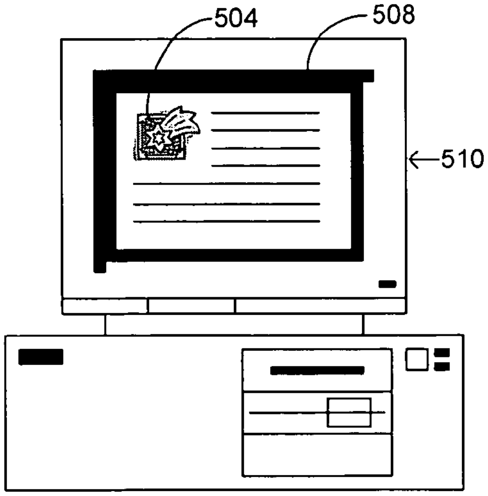
FIG. 5C shows an example of a customized transaction account message according to embodiments of the invention displayed on a computer.

FIG. 5A shows an embodiment of a transaction card 502 having a customized image 504 incorporated edge-to-edge on the card. The same customized image 504 is printed on the paper statement 506 shown in FIG. 5B. The customized image 504 may also appear in the electronic message 508 displayed on the computer 510 in FIG. 5C.

Figure 6:
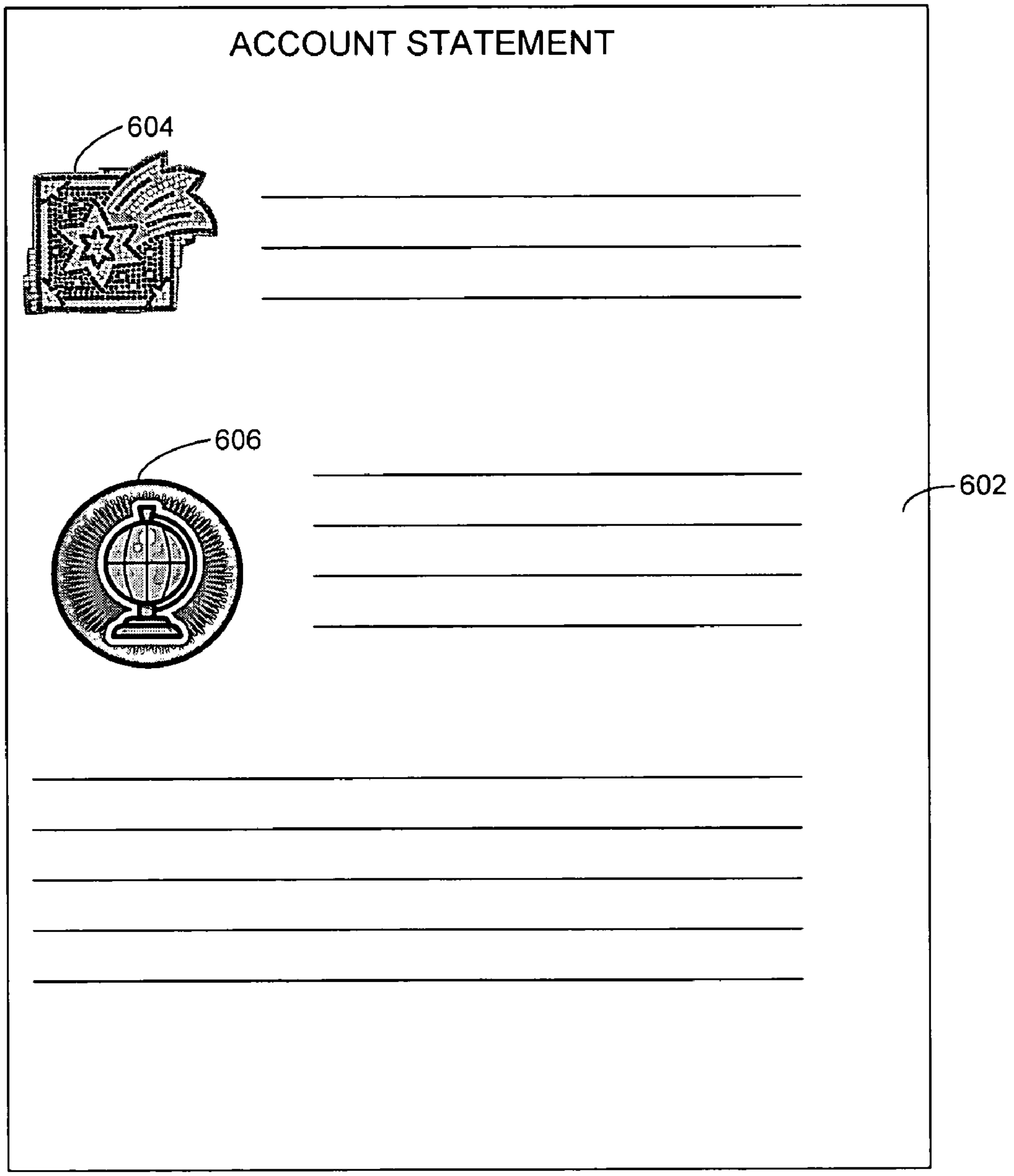
FIG. 6 shows an example of a customized transaction account statement that includes multiple customized images according to embodiments of the invention.

FIG. 6 shows an example of a customized transaction account statement 602 that includes multiple customized images 604 and 606 according to embodiments of the invention. The statement 602, which may be printed on a piece of paper, or displayed on a computer or other electronic display device as an electronic transaction statement, include a first customized image 604 adjacent to a summary of transaction activity for a first user of the account, and a second customized image 606 proximate to a summary of transaction activity for a second user of the account. The images 604 and 605 may also be incorporated on a first and second transaction card, respectively, issued to each of the account users.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms “a”, “an”, and “the” include plural referents unless the context clearly dictates otherwise. Thus, for example, reference to “a process” includes a plurality of such processes and reference to “the electrode” includes reference to one or more electrodes and equivalents thereof known to those skilled in the art, and so forth.

Also, the words “comprise,” “comprising,” “include,” “including,” and “includes” when used in this specification and in the following claims are intended to specify the presence of stated features, integers, components, or steps, but they do not preclude the presence or addition of one or more other features, integers, components, steps, acts, or groups.

What is claimed is:

1. A method of customizing communications to a transaction account user, the method comprising:
- incorporating a customized image created and sent by the user on a transaction card that is provided to the user; and
- displaying the customized image on one or more account message seen by the user;
- wherein the account message comprises a periodic account statement;
- and wherein the periodic account statement is a paper statement mailed to the user;
- and wherein the customized image is also printed on an envelope used to mail the paper statement to the user.

2. A method of customizing communications for a plurality of affiliated transaction accounts, the method comprising:
- supplying an account distributor with a plurality of transaction cards, wherein each of the transaction cards is associated with one of the plurality of transaction accounts, and wherein each of the transaction cards includes a customized image created and provided by the account distributor;
- distributing the plurality of transaction cards to account users; and
- incorporating the customized image on one or more messages about the transaction accounts that are sent to the account users.

3. The method of claim 2, wherein each of the transaction cards further comprises a unique image that is different for each of the transaction cards in the plurality of transaction cards.

4. The method of claim 3, wherein the unique image is also incorporated on the one or more messages sent to the account user.

5. The method of claim 3, wherein the unique image comprises the initials of the account user.

6. The method of claim 2, wherein the account distributor is a business entity and the account users are employees of the business entity.

7. The method of claim 6, wherein the customized image comprises a trademark for the business entity.

8. A method of customizing a statement for a transaction account used by two or more account users, the method comprising:
- sending a first account user a first customized transaction card having a first customized image, and a second account user a second customized transaction card having a second customized image, wherein the first and the second customized images are different; and
- displaying the first customized image next to one or more transactions listed on the customized statement that were conducted with the first customized transaction card, and displaying the second customized image next to one or more transactions listed on the customized statement that were conducted with the second customized transaction card.

9. The method of claim 8, wherein the customized statement is a printed statement mailed to the two or more account users.

10. The method of claim 8, wherein the customized statement is an electronic statement viewable online by the two or more account users.

11. The method of claim 8, wherein the two or more account users are members of a family.

12. The method of claim 8, wherein the first and the second customized images are uploaded from a computer connected to the Internet.

* * * * *